(12) United States Patent
Rabhi (10) Patent No.: US 6,601,551 B1
(45) Date of Patent: Aug. 5, 2003

(54) MECHANICAL TRANSMISSION DEVICE FOR ENGINE WITH VARIABLE VOLUME DISPLACEMENT

(76) Inventor: Vianney Rabhi, 35 Cour d'Herbouville, 69004 Lyon (FR)

(*) Notice: Subject to any disclaimer, the term of this patent is extended or adjusted under 35 U.S.C. 154(b) by 0 days.

(21) Appl. No.: 09/856,896

(22) PCT Filed: Nov. 25, 1999

(86) PCT No.: PCT/FR99/02901

§ 371 (c)(1),
(2), (4) Date: May 29, 2001

(87) PCT Pub. No.: WO00/31377

PCT Pub. Date: Jun. 2, 2000

(30) Foreign Application Priority Data

Nov. 26, 1998 (FR) .............................................. 98 15089

(51) Int. Cl.⁷ ............................................... F02B 75/04
(52) U.S. Cl. ................. 123/78 E; 123/197.1; 123/48 B
(58) Field of Search ............................. 123/78 E, 48 B, 123/197.1, 197.3, 197.2

(56) References Cited

U.S. PATENT DOCUMENTS

| | | | | |
|---|---|---|---|---|
| 1,567,172 A | * | 12/1925 | Powell ........................... | 74/29 |
| 2,088,504 A | * | 7/1937 | Brzezinski ..................... | 74/30 |
| 4,498,430 A | * | 2/1985 | Giuliani et al. ............ | 123/53.1 |

* cited by examiner

Primary Examiner—Tony M. Arganbright
Assistant Examiner—Katrina B. Harris
(74) Attorney, Agent, or Firm—Young & Thompson (57) ABSTRACT

A mechanical transmission device for an engine with variable volume displacement comprising a piston (2) interlocked in its lower part with a control rack (3), co-operating with a ball-bearing guiding device (4) and with a gear assembly (5) integral with a connecting rod (6) for transmitting movement between the piston and the connecting rod.

30 Claims, 6 Drawing Sheets

MECHANICAL TRANSMISSION DEVICE FOR ENGINE WITH VARIABLE VOLUME DISPLACEMENT

The present invention relates to a mechanical transmission device for the frictionless guidance of the pistons of a variable displacement engine.

The mechanical transmission device according to the present invention consists in improving the device which makes it possible to vary, while they are in operation, the working volumetric displacement and/or working volumetric ratio of the piston engines described in French patent application No. 97 05943 in the name of the applicant.

The mechanical transmission device according to the invention has the advantage of making each part of the variable displacement engine easier to machine.

Finally, the mechanical transmission device offers an original solution to limiting friction between the piston and the engine block.

The mechanical transmission device for a variable displacement engine according to the present invention comprises a piston secured at its lower part to a rack collaborating:

On the one hand, with a rolling-bearing guide device, consisting of at least one roller which provides frictionless guidance of said rack on the engine block and of a gearing device which allows the displacement of said roller with respect to te piston to be synchronized, And on the other hand, with a gear secured to a connecting rod to allow movement to be transmitted between the piston and said connecting rod.

The mechanical transmission device according to the present invention comprises a piston which consists of a thick disk secured on one of its faces to a support leg.

The mechanical transmission device according to the present invention comprises a support leg which has a finned structure having a flared profile, the widest part of which faces toward the face of the disk, fins uniformly distributed about its periphery to allow the piston to be cooled, and a mounting block.

The mechanical transmission device according to the present invention comprises a mounting block which at its middle and over its height has a vertical slot which lies in the continuation of the support leg.

The mechanical transmission device according to the present invention comprises a mounting block which on each side of the slot has, on the one hand, in a vertical plane a bearing face and, on the other hand, in a horizontal plane parallel to the one containing the disk, a thrust face.

The mechanical transmission device according to the present invention comprises a rack which is connected to the piston by a link rod of T-shaped cross section, which is fixed into the mounting block.

The mechanical transmission device according to the present invention comprises a link rod which has a first web which penetrates the vertical slot of the mounting block to such a point that the hole formed in said web collaborates with the bore to allow a screw to pass through said mounting block and collaborate with a tightening nut.

The mechanical transmission device according to the present invention comprises a link rod which has a second web perpendicular to the first and which bears against the face of the mounting block.

The mechanical transmission device according to the present invention comprises a rack which consists of two independent elements forming half racks which are fixed one on each side of the first web of the link rod.

The mechanical transmission device according to the present invention comprises two half racks, each of which in its upper part has a face which comes into contact with the thrust face of the mounting block.

The mechanical transmission device according to the present invention comprises two half racks, each of which comprises a first rack of a small size which collaborates with the rolling-bearing guide device, and a second rack of large size facing in the opposite direction to the first, to collaborate with the gear that transmits movement between the piston and the connecting rod.

The mechanical transmission device according to the present invention comprises a rolling-bearing guide device which consists of at least one roller which provides frictionless guidance of the half racks on the engine block.

The mechanical transmission device according to the present invention comprises a rolling-bearing guide device which consists of at least one roller which provides frictionless guidance of the half racks on the engine block, and of a gearing device which allows the displacement of said roller with respect to the piston to be synchronized.

The mechanical transmission device according to the present invention comprises a rolling-bearing guide device which consists of synchronized rollers which provide frictionless guidance of the half racks on the engine block, and of a gearing device which allows the displacement of said rollers with respect to the piston to be synchronized.

The mechanical transmission device according to the present invention comprises a rolling-bearing guide device which consists of synchronized rollers which provide frictionless guidance of the half racks on the engine block, and of a gearing device which allows the displacement of said rollers with respect to the piston to be synchronized, and of an elastic coupling provided between said rollers and said gearing device, which allows variations in speed.

The mechanical transmission device according to the present invention comprises rollers, each of which consists of a hollow cylindrical sleeve which collaborates with the runway surface of the second web of the link rod and with a smooth plate secured to the engine block.

The mechanical transmission device according to the present invention comprises a gearing device which comprises gear wheels which are fixed to each end of the sleeves.

The mechanical transmission device according to the present invention comprises gear wheels which collaborate with the small-sized racks of each half rack and with a piece the longitudinal ends of which have a rack.

The mechanical transmission device according to the present invention comprises gear wheels which have a central bore which has splines collaborating with those machined at each end of a shaft which allows said wheels to be joined together at each end of the hollow cylindrical sleeve.

The mechanical transmission device according to the present invention comprises a shaft, the outside diameter of which is of dimensions which are designed so that it can pass through the interior bore of the hollow cylindrical sleeve and therewith delimit a gap so that an elastic coupling can be fitted.

The mechanical transmission device according to the present invention comprises an elastic coupling which consists of a ring provided between the sleeve and the gear wheels so that a difference in speed between the sleeve and the gear wheels does not cause premature destruction of the latter and of the racks of the gearing device.

The mechanical transmission device according to the present invention comprises rollers consisting of sleeves which roll along the face of the second web of the T-section link rod, on the one hand, and along the smooth plate fixed to the engine block, on the other hand.

The mechanical transmission device according to the present invention comprises a gear which has a truncated profile comprising, on each side of its central bore, sets of teeth collaborating respectively with the second rack of the half racks and the control rack which is mounted in a cavity, or on a guide, each formed in the engine block.

The mechanical transmission device according to the present invention comprises a gear which between the sets of teeth has a recess for accommodating the connecting rod, more specifically its small end, so that its bore collaborates with that of said gear.

The mechanical transmission device according to the present invention comprises a gear which midway across the width of each set of teeth, has a curved groove, the radius of curvature of which is centered on the point about which said gear rocks about the connecting rod.

The mechanical transmission device according to the present invention comprises curved-profile segments which are fixed inside the grooves to constitute the runway surfaces of the gear.

The mechanical transmission device according to the present invention comprises a control rack collaborating with the sets of teeth of the gear which midway across the width has a vertical and straight groove in which a segment of the same profile is fixed.

The mechanical transmission device according to the present invention comprises a gear, the segment of the sets of teeth of which runs along the edge face of the first web of the link rod, while the other segment of the opposite sets of teeth of the gear runs along the straight segment of the control rack.

The mechanical transmission device according to the present invention has a point of contact between the synchronized rollers and the face of the second web on the one hand, and the smooth plate on the other hand, which lies on the pitch radius of the gear wheels.

The mechanical transmission device according to the present invention comprises segments which constitute runway surfaces, the point of contact of which is positioned on the pitch radius of the gear.

The description which will follow with reference to the appended drawings, which are given by way of non-limiting examples, will allow better understanding of the invention, of the characteristics it has and of the advantages it is likely to afford.

FIGS. 1 to 4 show a mechanical transmission device 1 for a variable displacement engine comprising a piston 2 secured at its lower part to a rack 3 collaborating, on the one hand, with a rolling-bearing guide device 4 and, on the other hand, with a gear 5 secured to a connecting rod 6 to allow movement to be transmitted between said piston and said connecting rod.

The piston 2 consists of a thick disk 20 which, round its periphery, takes firing, compression and oil-control piston rings known per se. The disk 20 is secured on one of its faces to a support leg 21 consisting of a finned structure 22 and of a mounting block 23.

The finned structure 22 has a flared profile, the widest part of which faces toward the face of the disk 20. The structure 22 has a certain number of fins 24 uniformly distributed about its periphery to allow the piston 2 to be cooled.

The mounting block 23 at its middle and over its height has a vertical slot 25 which lies in the continuation of the support leg 21. On each side of the slot 25 the mounting block 23 has, on the one hand, in a vertical plane, a bearing face 26 and, on the other hand, in a horizontal plane parallel to the one containing the disk 20, a thrust face 27, the functions of which will be explained hereinafter.

The mounting block 23 has, perpendicular to the slot 25, an open bore 28 for fitting a fixing screw 29.

The rack 3 is connected to the piston 2 by a link rod 30 of T-shaped cross section which is fixed into the mounting block 23 by means of the screw 29.

The link rod 30 has a first web 31 which penetrates the vertical slot 25 of the mounting block 23 to such a point that the hole 32 formed in said web collaborates with the bore 28 to allow the screw 29 to pass through said mounting block and collaborate with a tightening nut.

The link rod 30 has a second web 33 perpendicular to the first and which bears against the face 26 of the mounting block 23.

The rack 3 consists of two independent elements 34 and 35 known as half racks which are fixed one on each side of the first web 31 of the link rod 30 by clamping screws 36.

Each half rack 34, 35 in its upper part has a face 37 which comes into contact with the thrust face 27 of the mounting block 23 of the piston 2.

Each half rack 34, 35 has a first rack 38 of small size, and a second rack 39 of large size facing in the opposite direction to the first.

When the half racks 34, 35 are fixed on the link rod 30, it may be seen that the first racks 38 of small size are positioned one on each side of the first web 31 of said rod and over a large proportion of its height.

The rolling-bearing guide device 4 consists of synchronized rollers 40 which provide frictionless guidance of the half racks 34, 35 on the engine block, and of a gearing device 41 which allows the displacement of said rollers with respect to the piston 2 to be synchronized.

Figures 5A, 5B:
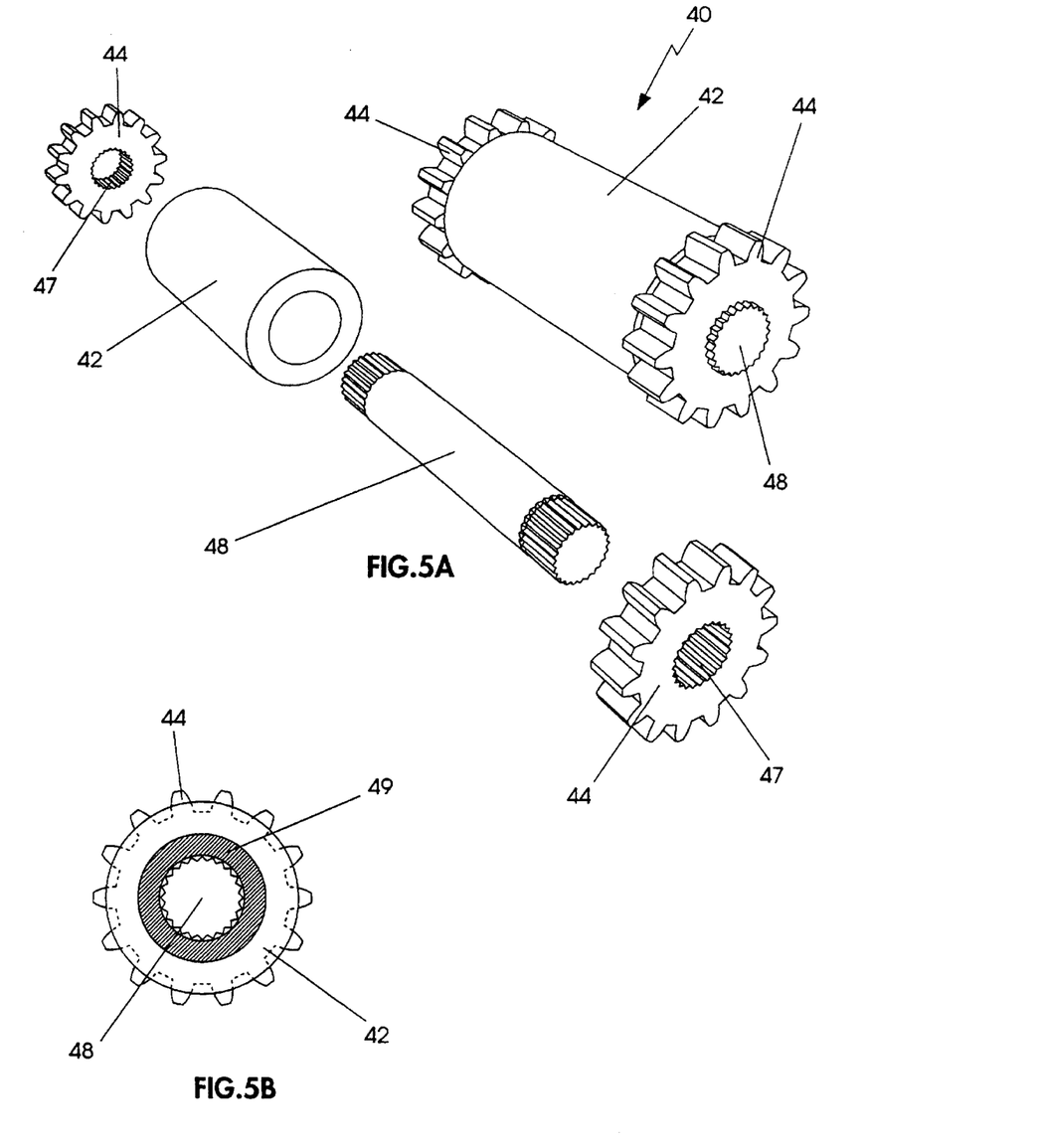
FIGS. 5A and 5B are views depicting, in detail, the rollers of the rolling-bearing guide device according to the present invention.

Each roller 40 consists of a hollow or solid cylindrical sleeve 42 which collaborates with the runway surface of the second web 33 of the link rod 30 and with a smooth plate 43 secured to the engine block.

The gearing device 41 comprises gear wheels 44 which are fixed to the rollers 40 at each end of the sleeves 42.

The gear wheels 44 collaborate with the small-sized racks 38 of each half rack 34, 35 and with a U-section piece 45, each of the longitudinal ends of which has a rack 46 which constitutes one of the elements of the gearing device 41.

The gear wheels 44 have a central bore 47 which has splines collaborating with those machined at each end of a shaft 48 which allows said wheels to be joined together at each end of the hollow cylindrical sleeve 42. The splined connection between the gear wheels 44 and the shaft 48 prevents any rotation of these wheels at with respect to said shaft (FIG. 5A).

The outside diameter of the shaft 48 is of a size which is designed so that it can pass through the interior bore of the cylindrical sleeve 42 and therewith delimit a gap to allow the fitting of a ring 49 made of a supple material such as rubber or any other similar material (FIG. 5B).

The ring 49 makes it possible to form an elastic and compressible coupling between the sleeve 42 and the gear wheels 44 so that a difference in speed between the sleeve and the gear wheels does not prematurely destroy the latter or the racks 38 and 46 of the gearing device 41.

It can be seen that the profile of the piece 45 allows the smooth plate 43 to lie in its recess so that the assembly can be fixed to the engine block and form a runway and synchronizing device on which the rollers 40 and the gear wheels 44 simultaneously run.

Note that the rollers 40 consisting of the sleeves 42 roll along the face of the second web 33 of the T-section link rod 30 on the one hand, and along the smooth plate 43 fixed to the engine block, on the other hand.

Furthermore, the point of contact between the synchronized rollers 40 and the face of the second web 33, on the one hand, and the smooth plate 43, on the other hand, lies on the pitch radius of the gear wheels 44.

Figure 6:
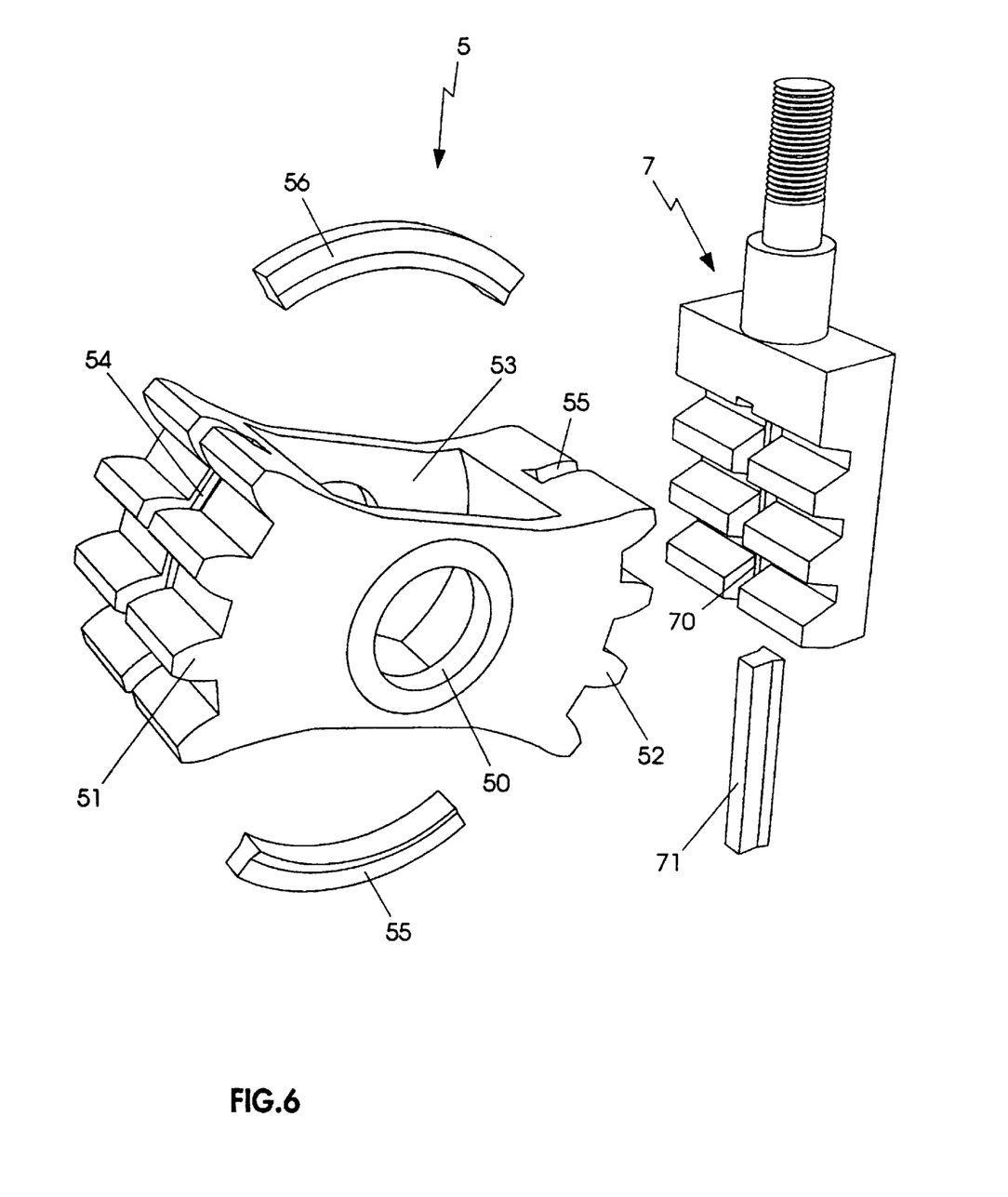
FIG. 6 is a perspective view showing, in detail, the gearing which allows movement to be transmitted between the piston and the connecting rod of the variable displacement engine.

FIG. 6 depicts the gear 5 of the mechanical transmission device 1 according to the present invention.

The gear 5 has a truncated profile comprising, on each side of its central bore 50, sets of teeth 51 and 52 collaborating respectively with the second rack 39 of the half racks 34 and 35, and with the control rack 7 which is mounted in a cavity, or on a guide, each formed in the engine block.

The position of the control rack 7 with respect to the engine block is given by a control device, not depicted, but which is described in a French patent application No. 98 04601 in the name of the applicant.

The gear 5 between the sets of teeth 51, 52 has a recess 53 to accommodate the connecting rod 6, and more particularly its small end 60, so that its bore 61 collaborates with that 50 of said gear. The latter is fixed to the small end 60 of the connecting rod 6 by a connecting shaft 62 which passes through the bores 50 and 61.

Midway across the width of each set of teeth 51, 52 there is a curved groove 54, 55, the radius of curvature of which is centered on the point about which the gear 5 rocks about the connecting rod 6.

Fixed inside the grooves 54, 55 are respective segments 56, 57 having a curved profile identical to those of said grooves. The segments 56, 57 may have a cross section of non-rectangular profile, preventing them from moving at all inside the grooves 54, 55 of the gear 5.

The control rack 7 collaborating with the sets of teeth 52 of the gear 5 mid-way across its width has a vertical and straight groove 70 in which a segment 71 of the same profile is fixed.

The segments 56, 57 and 71 constitute runway surfaces, the point of contact of which is positioned on the pitch radius of the gear 5. The runway surfaces center the gear 5 between the half racks 34, 35 on the one hand, and the control rack 7, on the other hand.

Figure 1:
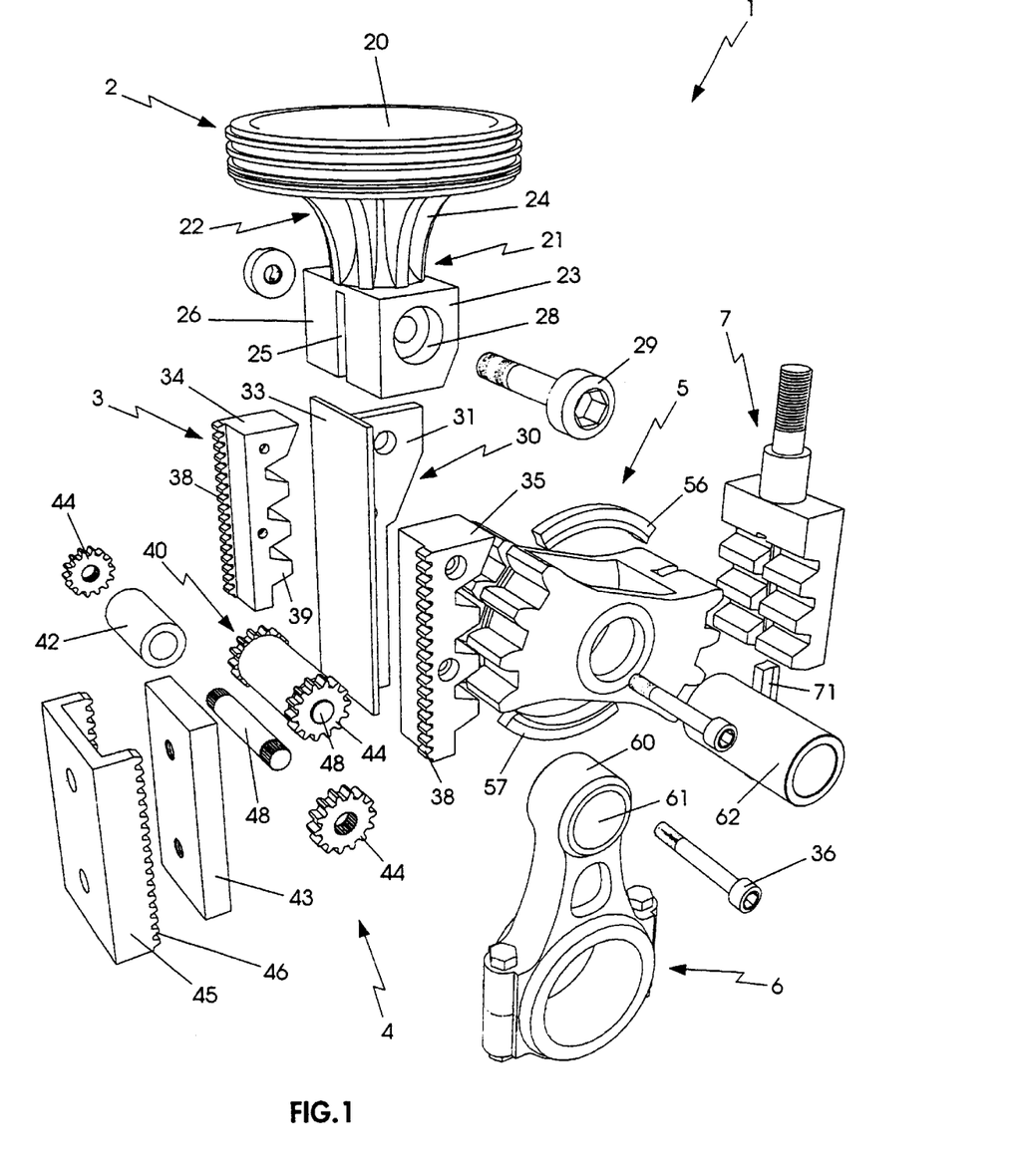
FIG. 1 is an exploded perspective view illustrating all of the parts that make up the mechanical transmission device according to the present invention.
Figure 2:
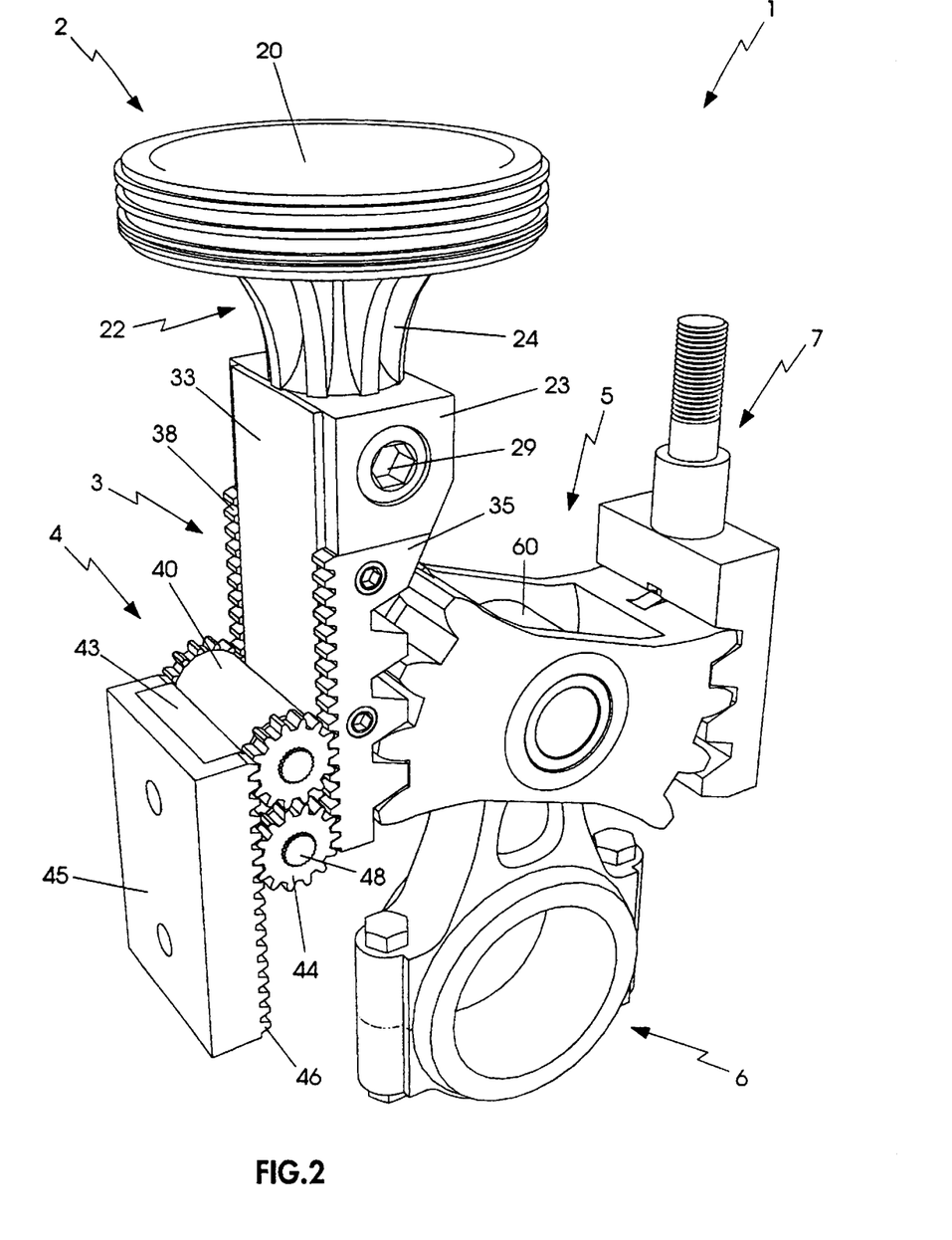
FIG. 2 is a perspective view depicting the mechanical transmission device in the assembled position.
Figure 3:
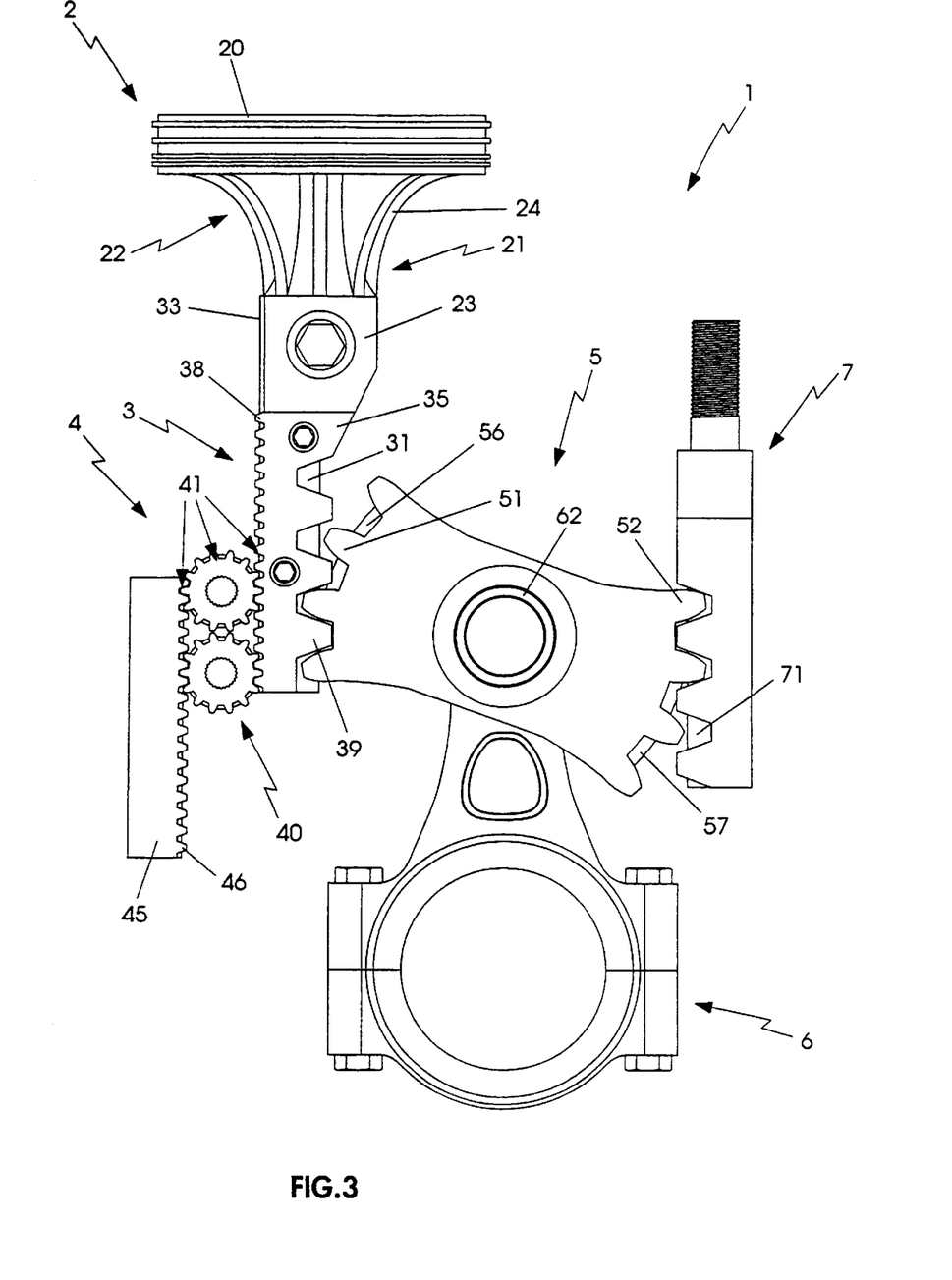
FIG. 3 is a side view showing the mechanical transmission device according to the present invention.
Figure 4:
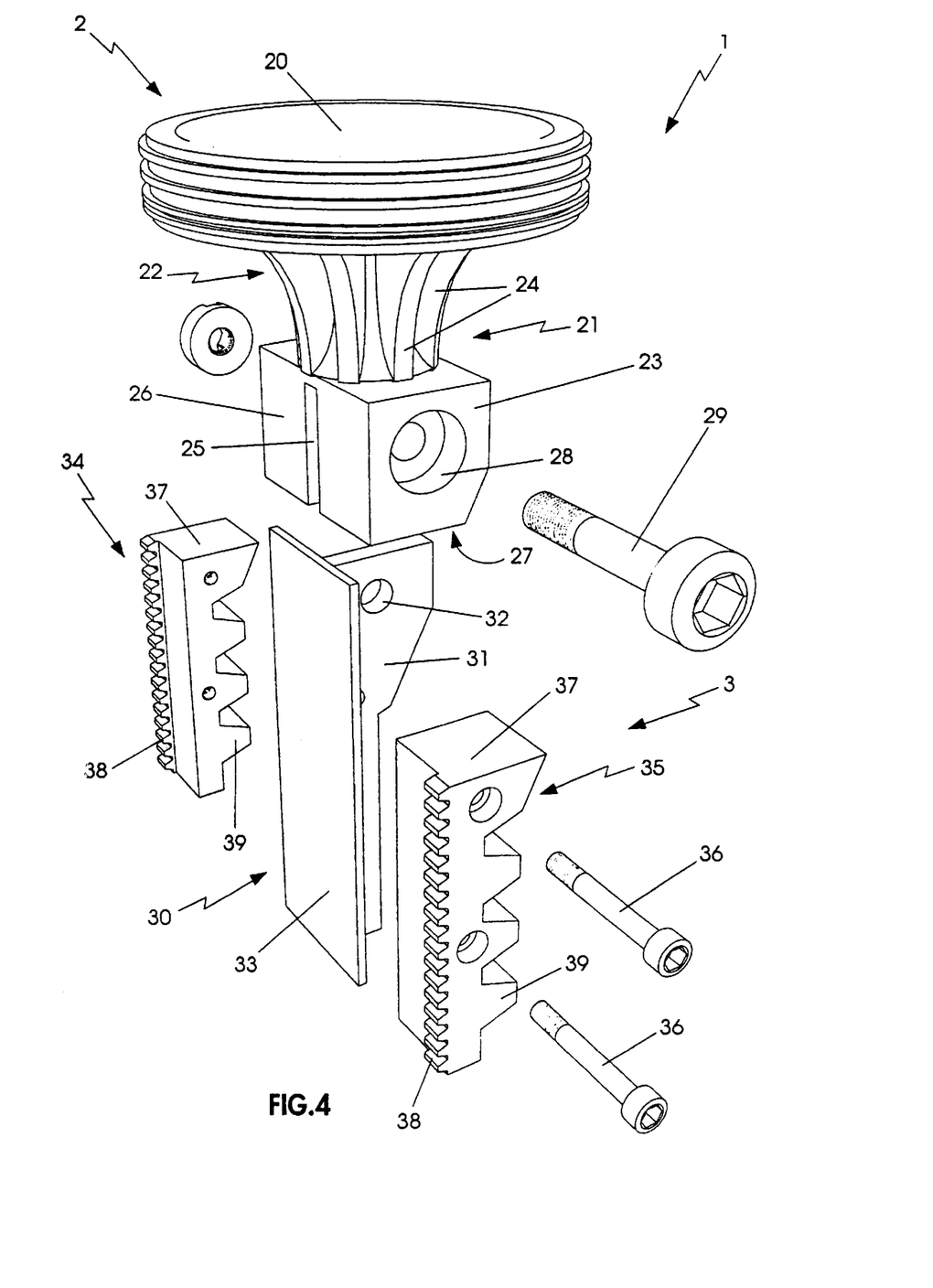
FIG. 4 is a perspective view illustrating, in detail, the piston and its rack according to the present invention.

What happens is that the segment 56 of the sets of teeth 51 of the gear 5 can run, while the variable displacement engine is in operation, along the edge face of the first web 31 of the link rod 30 and more specifically along the edge face lying under the mounting block 23 of the piston 2 (FIG. 3).

In addition, the segment 57 of the sets of teeth 52 of the gear 5 can run, while the variable displacement engine is in operation, along the straight segment 71 of the control rack 7 (FIG. 3).

It must also be understood that the foregoing description was given merely by way of example and that it does not in any way restrict the field of the invention, which would not be departed from if the embodiment details described were replaced by any other equivalent.

What is claimed is:

1. Mechanical transmission device for a variable displacement engine, characterized in that it comprises a piston (2) secured at its lower part to a rack (3) collaborating:

on the one hand with the rolling-bearing guide device (4), consisting of at least one roller (40) which provides frictionless guidance of said rack (3) on the engine block and of a gearing device (41) which allows the displacement of said roller with respect to the piston (2) to be synchronized, and on the other hand, with a gear (5) secured to a connecting rod (6) to allow movement to be transmitted between the piston and said connecting rod.

2. Mechanical transmission device according to claim 1, characterized in that the piston (2) consists of a thick disk (20) secured on one of its faces to a support leg (21).

3. Mechanical transmission device according to claim 2, characterized in that the suppor leg (21) has a finned structure (22) having flared profile, the widest part of which faces toward the face of the disk (20), fins (24) uniformly distributed about its periphery to allow the piston (2) to be cooled, and a mounting block (23).

4. Mechanical transmission device according to claim 3, characterized in that the mounting block (23) at its middle and over its height has a vertical slot (25) which lies in the continuation of the support leg (21).

5. Mechanical transmission device according to claim 4, characterized in that the mounting block (23) on each side of the slot (25) has, on the one hand, in a vertical plane a bearing face (26) and, on the other hand, in a horizontal plane parallel to the one containing the disk (20), a thrust face (27).

6. Mechanical transmission device according to claim 3, characterized in that the rack (3) is connected to the piston (2) by a link rod (30) of T-shaped cross section, which is fixed into the mounting block (23).

7. Mechanical transmission device according to claim 6, characterized in that the link rod (30) has a first web (31) which penetrates the vertical slot (25) of the mounting block (23) to such a point that the hole (32) formed in said web collaborates with the bore (28) to allow a screw (29) to pass through said mounting block and collaborate with a tightening nut.

8. Mechanical transmission device according to claim 6, characterized in that the link rod (30) has a second web (33) perpendicular to the first and which bears against the face (26) of the mounting block (23).

9. Mechanical transmission device according to claim 6, characterized in that the rack (3) consists of two independent elements (34 and 35) forming half racks which are fixed one on each side of the first web (31) of the link rod (30).

10. Mechanical transmission device according to claim 9, characterized in that each half rack (34, 35) in its upper part has a face (37) which comes into contact with the thrust face (27) of the mounting block (23).

11. Mechanical transmission device according to claim 9, characterized in that each half rack (34,35) comprises a first rack (38) of a small size which collaborates with the rolling-bearing guide device (4), and a second rack (39) of large size facing in the opposite direction to the first, to collaborate with the gear (5) that transmits movement between the piston(2) and the connecting rod (6).

12. Mechanical transmission device according to claim 1, characterized in that the rolling-bearing guide device (4) consists of at least one roller (40) which provides frictionless guidance of half racks (34,35) forming the rack (3) on the engine block.

13. Mechanical transmission device according to claim 1, characterized in that the rolling-bearing guide device (4) consists of at least one roller (40) which provides frictionless guidance of half racks (34,35) forming the rack (3) on the engine block, and of a gearing device (41) which allows the displacement of said roller with respect to the piston (2) to be synchronized.

14. Mechanical transmission device according to claim 1, characterized in that the rolling-bearing guide device (4) consists of synchronized rollers (40) which provide frictionless guidance of half racks (34,35) forming the rack (3) on the engine block, and of a gearing device (41) which allows the displacement of said rollers with respect to the piston (2) to be synchronized.

15. Mechanical transmission device according to claim 1, characterized in that the rolling-bearing guide device (4) consists of synchronized rollers (40) which provide frictionless guidance of half racks (34,35) forming the rack (3) an the engine block, and of a gearing device (41) which allows the displacement of said rollers with respect to the piston (2) to be synchronized, and of an elastic coupling (49) provided between said rollers and said gearing device, which allows variations in speed.

16. Mechanical transmission device according to claim 1, characterized in that each roller (40) consists of a hollow cylindrical sleeve (42) which collaborates with the runway surface of the second web (33) of the link rod (30) and with a smooth plate (43) secured to the engine block.

17. Mechanical transmission device according to claim 16, characterized in that the gearing device (41) comprises gear wheels (44) which are fixed to each end of the sleeves (42).

18. Mechanical transmission device according to claim 17, characterized in that the gear wheels (44) collaborate with the small-sized racks (38) of each half rack (34,35) and with a piece (45) the longitudinal ends of which have a rack (46).

19. Mechanical transmission device according to claim 17, characterized in that the gear wheels (44) have a central bore (47) which has splines collaborating with those machined at each end of a shaft (48) which allows said wheels to be joined together at each end of the hollow cylindrical sleeve- (42).

20. Mechanical transmission device according to claim 19, characterized in that the outside diameter of the shaft (48) is of dimensions which are designed so that it can pass through the interior bore of the hollow cylindrical sleeve (42) and therewith delimit a gap so that an elastic coupling (49) can be fitted.

21. Mechanical transmission device according to claim 18, characterized in that the elastic coupling consists of a ring (49) provided between the sleeve (42) and the gear wheels (44) so that a difference in speed between the sleeve and the gear wheels does not cause premature destruction of the latter and of the racks (38 and 46) of the gearing device (41).

22. Mechanical transmission device according to claim 16, characterized in that the rollers (40) consisting of the sleeves (42) roll along the face of the second web (33) of the T-section link rod (30), on the one hand, and along the smooth plate (43) fixed to the engine block, on the other hand.

23. Mechanical transmission device according to claim 1, characterized in that the gear (5) has a truncated profile comprising, on each side of its central bore (50), sets of teeth (51 and 52) collaborating respectively with the second rack (39) of the halt racks (34 and 35) and the control rack (7) which is mounted in a cavity, or on a guide, each formed in the engine block.

24. Mechanical transmission device according to claim 23, characterized in that the gear (5) between the sets of teeth (51,52) has a recess (53) for accommodating the connecting rod (6), more specifically its small end (60), so that its bore (61) collaborates with that (50) of said gear.

25. Mechanical transmission device according to claim 23, characterized in that the gear (5), midway across the width of each set of teeth (51,52), has a curved groove (54,55), the radius of curvature of which is centered on the point about which said gear rocks about the connecting rod (6).

26. Mechanical transmission device according to claim 25, characterized in that curved-profile segments (56,57) are fixed inside the grooves (54,55) to constitute the runway surfaces of the gear (5).

27. Mechanical transmission device according to claim 23, characterized in that the control rack (7) collaborating with the sets of teeth (52) of the gear (5) midway across the width has a vertical and straight groove (70) in which a segment (71) of the same profile is fixed.

28. Mechanical transmission device according to claim 26, characterized in that the segment (56) of the sets of teeth (51) of the gear (5) runs along the edge face of the first web (31) of the link rod (30), while the segment (57) of the sets of teeth (52) of the gear (5) runs along the straight segment (71) of the control rack (7).

29. Mechanical transmission device according to claim 22, characterized in that the point of contact between the synchronized rollers (40) and the face of the second web (33) on the one hand, and the smooth plate (43) on the other hand, lies on the pitch radius of the gear wheels (44).

30. Mechanical transmission device according to claim 26, characterized in that the segments (56,57,71) constitute runway surfaces, the point of contact of which is positioned on the pitch radius of the gear (5).

* * * * *